Patented Jan. 30, 1923.

1,443,552

UNITED STATES PATENT OFFICE.

THOMAS B. ALDRICH, OF DETROIT, MICHIGAN, ASSIGNOR TO PARKE, DAVIS & COMPANY, OF DETROIT, MICHIGAN, A CORPORATION OF MICHIGAN.

ESTERS OF TRIHALOGENTERTIARY BUTYL ALCOHOL AND PROCESS OF FORMING SAME.

No Drawing.   Application filed May 18, 1918.   Serial No. 235,343.

*To all whom it may concern:*

Be it known that I, THOMAS B. ALDRICH, a citizen of the United States of America, residing at Detroit, in the county of Wayne and State of Michigan, have invented certain new and useful Improvements in Esters of Trihalogentertiary Butyl Alcohol and Processes of Forming the Same, of which the following is a specification.

The invention relates to a new series of bodies which may be designated as esters of trihalogentertiary-butyl-alcohols, and the characteristic feature of the series is the combination of a benzoyl group with a trihalogentertiary-butyl-alcohol. I have formed a number of specific bodies belonging to this series, differing in the specific halogen used and also in the specific substitutions in the benzoyl group. As representative of these I shall describe one of the series,—viz the benzoic acid ester of trichlorotertiary-butyl-alcohol, which may be formed as follows:

One part of trichlorotertiary-butyl-alcohol (suitably dehydrated) is heated on a steam bath with one part of benzoyl chloride for several hours, or until hydrochloric acid gas ceases to be given off, the reaction being as follows:

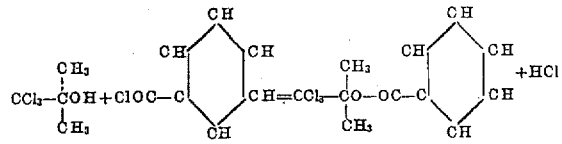

The reaction will be practically ended in six hours, although there is no objection to heating for a longer period. As soon as completed, water is added and the ester thrown out in the form of an oil which solidifies on cooling. While cooling, it is best to agitate the contents of the flask to prevent the ester from forming a hard cake which is difficult to remove. When the ester has solidified, the supernatant liquid is decanted as closely as possible, an excess of caustic soda solution (5-10%) is added, and the vessel heated on the steam bath for about half an hour. By this procedure any of the trichlorotertiary-butyl-alcohol or benzoyl chloride remaining will be decomposed or rendered soluble in water. At the end of this time, the flask is cooled as before and its contents poured into a mortar and ground to a fine powder. It is then placed on a suction filter and washed a number of times with cold water. The substance thus obtained may be purified by recrystallization from a solvent, such as moderately strong alcohol.

Benzoic acid ester of trichlorotertiary-butyl-alcohol may be graphically represented as follows:

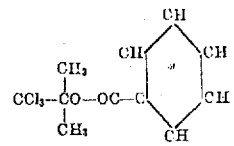

and has the following characteristics: It is in the form of white crystals (monoclinic) having a melting point of 34° to 35° C., may be distilled under reduced pressure without decomposition, is readily soluble in organic solvents and practically insoluble in water, is not readily saponified, but boiling with alkali (caustic soda 10%) decomposes the ester gradually, does not decompose by boiling with concentrated nitric acid, is not volatile in air but is slightly volatile with steam.

A second specific body, benzoic acid ester of tribromotertiary-butyl-alcohol, is formed in a similar manner by the treatment of tribromotertiary-butyl-alcohol with benzoyl chloride. Other specific bodies are the nitro benzoic esters of trihalogentertiary-butyl-alcohols—such for instance as the nitro benzoic ester of tribromotertiary-butyl-alcohol and the nitro benzoic ester of trichlorotertiary-butyl-alcohol. Another process which may be used in the forming of bodies as above described is one involving the treatment of trihalogentertiary-butyl-alcohol and benzoic acid with a suitable condensing agent, such as zinc chloride, the reaction being as follows:

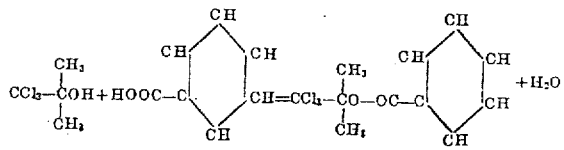

What I claim as my invention is:

1. A new body forming one of a series which may be designated as esters of trihalogentertiary-butyl-alcohols and characterized by the combination of a trihalogentertiary-butyl-alcohol with an acyl benzoyl group, said body having the following characteristics: relative stability, insolubility in water and extreme solubility in the organic solvents.

2. A new body forming one of a series which may be designated as esters of trichlorotertiary-butyl-alcohol and characterized by the combination with trichlorotertiary-butyl-alcohol of an acyl benzoyl group, said body having the following characteristics: relative stability, insolubility in water and extreme solubility in the organic solvents.

3. The new body, benzoic acid ester of trichlorotertiary-butyl-alcohol having the following characteristics: in the form of white crystals having a melting point of 34° to 35° C., may be distilled under reduced pressure without decomposition, is readily soluble in organic solvents and practically insoluble in water, is not readily saponified, will be decomposed gradually on boiling with alkali, does not decompose by boiling with concentrated nitric acid, is not volatile in water but is slightly volatile with steam.

In testimony whereof I affix my signature.

THOMAS B. ALDRICH.